Patented Nov. 16, 1937

2,099,432

UNITED STATES PATENT OFFICE 2,099,432

REACTION PRODUCTS OF GLYCOLS AND ALKALOIDS

Samuel Ruben, New Rochelle, N. Y.

No Drawing. Application January 31, 1936, Serial No. 61,808

7 Claims. (Cl. 260—25)

This invention relates to mixtures and reaction products thereof of a glycol and an alkaloid.

An object of the invention is the provision of alkaloid compositions, soluble in water or aqueous mediums, which are stable and easily administered. Other objects will be apparent from the disclosure.

In the therapeutic application of alkaloids, it has been necessary, in many instances, to use an acid salt, for instance, the sulfate of the alkaloid, in order to obtain solubility in water. This necessitates the use of a considerable quantity of the alkaloid and adds an undesirable factor in that the acid radicle has a toxic limit of its own.

I have found that by heating glycol and various alkaloids, such as quinine, strychnine, codein and ephedrine, to a temperature in the order of 120° C., that I can obtain reaction products in the form of clear solutions soluble in water.

In forming the composition, the components, for instance 2½ grams of quinine or ephedrine are mixed with 100 grams of ethylene glycol and slowly heated to 120° C., at which temperature a clear solution is obtained. The glycol-ephedrine reaction product prepared as described forms a clear solution with any quantity of water. The glycol-quinine reaction product prepared as described is soluble in the order of 1 part to 50 parts of water. Where used with a lesser quantity of water, an opalescent solution is obtained. It will be observed that there is an excess of glycol present in the solution as prepared.

I have found that unless the alkaloid and glycol are heated to a temperature in the order of 120° C., the desirable reaction products of my invention are not obtained. The proportions of ingredients may, of course, be varied depending on the applications.

In the preparation of the solutions, di-ethylene glycol or propylene glycol may be substituted for the ethylene glycol, but I have found the latter preferable.

I claim:

1. A therapeutic composition comprising essentially the water soluble reaction product of a glycol and an alkaloid of the following group: quinine, strychnine, codein and ephedrine.

2. A therapeutic composition comprising essentially the water soluble reaction product of ethylene glycol and an alkaloid of the following group: quinine, strychnine, codein and ephedrine.

3. A therapeutic composition comprising essentially the water-soluble reaction product of a glycol and ephedrine.

4. A therapeutic composition comprising essentially the water-soluble reaction product of a glycol and quinine.

5. A therapeutic composition comprising essentially the water-soluble reaction product of a glycol and codein.

6. A therapeutic composition comprising essentially the water-soluble reaction product of a glycol and an alkaloid heated to a temperature in the order of 120° C., the alkaloid being selected from the group consisting of quinine, strychnine, codein and ephedrine.

7. The method of preparing a therapeutic composition which comprises heating glycol and an alkaloid to a temperature in the order of 120° C., the alkaloid being selected from the group consisting of quinine, strychnine, codein and ephedrine.

SAMUEL RUBEN.